(12) United States Patent
Williams et al.

(10) Patent No.: US 7,450,930 B2
(45) Date of Patent: Nov. 11, 2008

(54) DIGITAL RIGHTS MANAGEMENT USING A TRIANGULATING GEOGRAPHIC LOCATING DEVICE

(75) Inventors: Jim C. Williams, Yorba Linda, CA (US); John Christopher Park Russell, San Diego, CA (US)

(73) Assignee: Motion Picture Association of America, Sherman Oaks, CA (US)

( * ) Notice: Subject to any disclaimer, the term of this patent is extended or adjusted under 35 U.S.C. 154(b) by 37 days.

(21) Appl. No.: 11/005,937

(22) Filed: Dec. 6, 2004

(65) Prior Publication Data

US 2005/0124319 A1  Jun. 9, 2005

Related U.S. Application Data

(60) Provisional application No. 60/527,378, filed on Dec. 5, 2003.

(51) Int. Cl.
*H04M 1/68* (2006.01)
(52) U.S. Cl. .............. 455/411; 455/456.3; 455/456.6; 380/258
(58) Field of Classification Search ...... 455/456.1–457, 455/26.1, 461, 466, 404.2, 412.2, 410–411, 455/414.2, 415, 433, 440, 412.1, 414.3, 414.1; 713/182, 184, 185; 380/255, 258, 229, 232, 380/247, 250
See application file for complete search history.

(56) References Cited

U.S. PATENT DOCUMENTS

| | | | | |
|---|---|---|---|---|
| 6,009,116 A | * | 12/1999 | Bednarek et al. ............ 375/130 |
| 6,108,365 A | * | 8/2000 | Rubin et al. ................. 375/130 |
| 6,480,961 B2 | * | 11/2002 | Rajasekharan et al. ......... 726/27 |
| 6,725,051 B2 | * | 4/2004 | Fidler ....................... 455/456.1 |
| 6,744,892 B2 | * | 6/2004 | Akins et al. .................. 380/241 |
| 6,925,469 B2 | * | 8/2005 | Headings et al. ............. 707/102 |
| 6,978,023 B2 | * | 12/2005 | Dacosta ...................... 380/258 |
| 7,058,414 B1 | * | 6/2006 | Rofheart et al. ........... 455/456.4 |
| 2002/0017977 A1 | * | 2/2002 | Wall .......................... 340/5.28 |
| 2002/0051540 A1 | * | 5/2002 | Glick et al. ................. 380/258 |
| 2002/0058519 A1 | * | 5/2002 | Nagahara .................... 455/456 |
| 2002/0142797 A1 | * | 10/2002 | Tarighi et al. ............... 455/556 |
| 2002/0177449 A1 | * | 11/2002 | McDonnell et al. ......... 455/456 |
| 2003/0083954 A1 | * | 5/2003 | Namba ........................ 705/26 |
| 2004/0127196 A1 | * | 7/2004 | Dabbish et al. ............. 455/411 |
| 2004/0127235 A1 | * | 7/2004 | Kotzin ....................... 455/466 |
| 2004/0190718 A1 | | 9/2004 | Dacosta |
| 2004/0193902 A1 | * | 9/2004 | Vogler et al. ................ 713/193 |
| 2004/0198392 A1 | * | 10/2004 | Harvey et al. ............. 455/456.1 |
| 2005/0176404 A1 | * | 8/2005 | Hundscheidt et al. ....... 455/406 |
| 2005/0278716 A1 | * | 12/2005 | Koppen et al. .............. 717/168 |

OTHER PUBLICATIONS

International Search Report and Written Opinion, PCT/US/2004/040860.

* cited by examiner

*Primary Examiner*—Charles N Appiah
*Assistant Examiner*—Anthony S Addy
(74) *Attorney, Agent, or Firm*—Connolly Bove Lodge & Hutz LLP; Jonathan A. Jaech

(57) ABSTRACT

A method and system for controlling distribution of content within a personal domain that makes use of a determination of the relative proximity to a source device or the geographic locations of the receiving devices. The location information may be determined using a Global Positioning System (GPS) or wireless triangulation systems. Usage rights for devices in the network are determined using the location or proximity determination.

19 Claims, 4 Drawing Sheets

DIGITAL RIGHTS MANAGEMENT USING A TRIANGULATING GEOGRAPHIC LOCATING DEVICE

CROSS-REFERENCE TO RELATED APPLICATION

This application claims priority pursuant to 35 U.S.C. § 119(e) to U.S. Provisional Patent Application No. 60/527,378, filed Dec. 5, 2003, which application is specifically incorporated herein, in its entirety, by reference.

BACKGROUND OF THE INVENTION

1. Field of the Invention

The present invention relates to methods and systems for controlling use of digital copyrighted material by networked devices using a determination of geographic location.

2. Description of Related Art

Recent developments in broadband technology have enabled cost-effective distribution of high-value content over a broadband network, both locally and remotely. In addition, the increasingly wide availability of in-home network technology allows a broad range of consumer electronic devices to be easily interconnected. For example, a digital TV, a digital VCR, a digital cable set-top box, and various other devices like stereo systems and computers can all be interconnected via an in-home network. The utility of such a home media network is apparent in that customers can view and re-transmit digital content from any of the interconnected devices. In such networks, set-top boxes or other content-receiving devices may function as distribution nodes of a broadband network, free of geographic restrictions. For example, a network may be used to distribute content both within the original home of the set-top-box and to another home that is either in close proximity or remote.

These increases in utilization of networked systems in and between homes, offices, and other locations, along with the increases in efficiency of broadband communication, have increased the threat of remote redistribution of digital content from authorized to unauthorized clients via the broadband connection. Fear of illegal and rampant copying and re-distribution of digital content over networked systems may prevent TV and movie providers from utilizing this method of transmission for their content. Additionally, mere re-broadcasting or redistribution of a content signal over a broadband network may not require any copying of content. Traditional copy-protection methods focused on preventing copying of the content may not effectively prevent redistribution or rebroadcast of such content.

Current systems exist whereby a broadcaster can determine with reasonable confidence the location of the original receiving set-top box. For example, a conditional access (CA) system relies on a system of periodic connection over a telephone line and automatic number identification (ANI) technology to verify the information regarding customers, their addresses and phone numbers. Decryption of content is then permitted or denied, based on the verified geographic location of the customer. ANI comprises a back-office headend database of customers' addresses and associated telephone numbers. In an ANI system, receiving devices are configured to periodically call the headend office, which uses the database and the incoming telephone number to verify the device address, as known in the art. Disadvantageously, this may require a telephone connection for each controlled receiving device.

Alternately, some systems rely on the limited reach of a broadcast antenna to fulfill the geographic usage right condition on receiving the broadcast content. These systems enable a content provider to ensure that the original transmission of digital content is authorized, but they are not able to ensure that retransmission or rebroadcast of that content is also authorized. For example, a broadcast signal received in London, England may readily be converted to a digital form and retransmitted to the United States using existing broadband technology.

In order to take advantage of broadband distribution in light of home networking technology, new content protection and copy management systems should ensure the content cannot be redistributed to another customer or another unauthorized location using a broadband distribution network. Thus, additional systems and methods are needed to determine whether a networked set-top box or other receiving device is within the same home, or similar geographic proximity, as the first set-top box. Furthermore, in order to determine relative proximity within clusters of devices, the methods should ensure a high degree of accuracy and reliability, without unduly inconveniencing permitted uses of content.

It is desirable, therefore, to provide a method and system for determining with a high degree of accuracy the relative proximity or geographic location of any networked device receiving digital content over a network. It is further desirable to make use of geographic information regarding the additional networked devices' relative proximity to the original receiving device, to provide a greater degree of control over redistribution of content from the recipient device to other devices networked to the recipient. It may also be desirable to prevent digital content from being redistributed out of a defined geographic area, such as an area defined by the range of a broadcast signal.

SUMMARY OF THE INVENTION

The present invention provides a system and method for determining with high accuracy and reliability the geographic location or relative proximity of a device receiving digital content over a network. The location or proximity information may be used to determine whether the receiving device is within a predetermined range or proximity to the source device and thus, whether it is authorized access to that content. The location information may also be used to determine whether a second interconnected receiving device is within the same home, or a similar geographic proximity, as the first receiving device.

A system according to the invention may use a Global Positioning System (GPS) receiver to determine a geographic location of a receiving device. In the alternative, or in addition, a triangulating system using GSM, CDMA or G3 wireless communication signals or radio signals may be used to determine the geographic location. GPS and other locating technologies making use of triangulation techniques are known in the art. A digital rights management system may then develop and enforce content usage rights for content based on the geographic location of the receiving device, or its relative proximity to a source device.

In an embodiment of the invention, each source and receiving device includes a secure content manager (SCM) that uses existing cryptographic methods to secure transmissions of content and content usage rules. A robustly implemented secure GPS processor (SGP) or other triangulating locating device may be provided in proximity to a receiving device of the system. The SGP may be configured to provide a geographic location, for example, coordinates of latitude, longitude, and altitude. The SGP may also be associated with a secure, unique identifier.

In an embodiment of the invention, SGPs within source and receiving devices may initiate and authenticate a secure communication session using their unique identifiers and any suitable method of authentication. For example, the SGPs may be configured to bypass host SCMs during these communications, to ensure that they establish a secure link. The SGPs then receive input from tamper-resistant GPS (or other signal) antennas to determine their own geographic locations to within a desired level of precision. The SGPs may then communicate to determine a distance between the source and receiving devices. Alternatively, the SGPs may determine a geographic location of the receiving device.

Once the SGPs have determined the geographic location for the receiving device, or a distance between the source and receiving devices, this information may be used to generate a set of usage rules for the requested content. For example, a system may operate in a "local versus remote mode," using a distance between the source and receiving devices. If this distance is less than a pre-determined distance, the receiving device may be characterized as "local," if otherwise, as "remote." The SCM may then authorize or prohibit usage of the content based on the "local" or "remote" determination. Alternatively, the system can base its authorization decisions on a geographic location of the destination. For example, use of the content may be permitted if the receiving device is inside (or outside) of a particular country, province, state, county, metropolitan region, city, neighborhood, block, tract, house, apartment, or room. For further example, use of the content may be permitted if the receiving device is located at, within a defined distance of, or further than a defined distance from, a particular geographic coordinate.

In another embodiment, the relative or absolute location determination from the SGPs can be combined with independently-determined parameters to develop content usage rules based on a combination of parameters. Such parameters may include, for example, domain membership or affinity, a count of the number of devices in a user's domain, a maximum distance between two devices in a domain, usage history of a device or domain, identity of a user, time of day, or any other desired parameter. The geographic location and other parameters may be stored within a secure architecture of the source SCM. The source SCM and SGP may combine the geographic data with other parameter data to apply a more sophisticated content usage rule for the receiving device.

Communications between source and receiving devices should be secured, using any suitable method as known in the art. For example, a source SCM or SGP may generate an encryption key at the source device. Concurrently, the destination SCM or SGP may generate a decryption key at the destination. The source and receiving devices then use existing shared secrets or public/private key exchange technology to establish a secured session, and exchange the encryption keys. Subsequently, communications between the source and receiving devices may be encrypted and decrypted using the keys.

To control content delivered to multiple receiving devices, a source device may determine usage rights for each receiving device independently, for example, by using a secure communication session with each receiving device. In such case, every receiving device may be equipped with its own triangulating locating device, or connected to a nearby locating device. In the alternative, or in addition, if all of the receiving devices in a domain have the same usage rights, then the source device may transmit content bound to usage rights and a decryption key that may be shared with all the devices in the domain. The shared key and rights may be configured to permit any device in the domain to use the content. In the alternative, more sophisticated rules may be employed to discriminate between devices in a domain, whether or not the location of every device in the domain is determined using a triangulating locating device.

The invention may also be used with multiple source devices and multiple receiving devices. For example, this system can be used to determine whether multiple receiving devices are located within a certain geographic market, or whether two networked requesting devices are close to each other, or remote from each other. In an embodiment of the invention, an SCM within each receiving device may communicate with an SCM in a corresponding source device. It should be apparent that a source device may also be a receiving device, in that the same device may receive content and retransmit the content to a downstream receiving device. Therefore, a receiving device may determine a geographic location of a downstream device, and use it to control access to content that may be retransmitted downstream.

Thus, one receiving device in a domain may be permitted access to content such as by being given a decryption key, while the another downstream receiving device in the same domain may be denied access to the content. For example, the original receiving device may be authorized to view the content, but the downstream receiving device may be determined to be so remote that is not within the user's domain, or not within the authorized usage location of the broadcast.

In the alternative, or in addition, access to the content may be permitted in a given geographic area, regardless of proximity to an original receiving device. In such case, each requesting device may establish communications independently with an SCM of an original source device, and provide the original source with its geographic location data using an associated SGP. If a particular receiving device is either determined to be a permitted distance from the source or in a permitted geographic area, the original source may permit the content to be accessed by that receiving device. For example, an encryption/decryption key pair may be generated by the original source and any qualified receiving device, regardless where the receiving device originally obtained the content.

A more complete understanding of the geographic location determining method will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a method and system for determining the geographic location of a device or the relative proximity of interconnected devices, and the use of geographic information for digital rights management, that overcomes the limitations of the prior art. In the detailed description that follows, like element numerals are used to describe like elements appearing in one or more figures.

Figure 1:
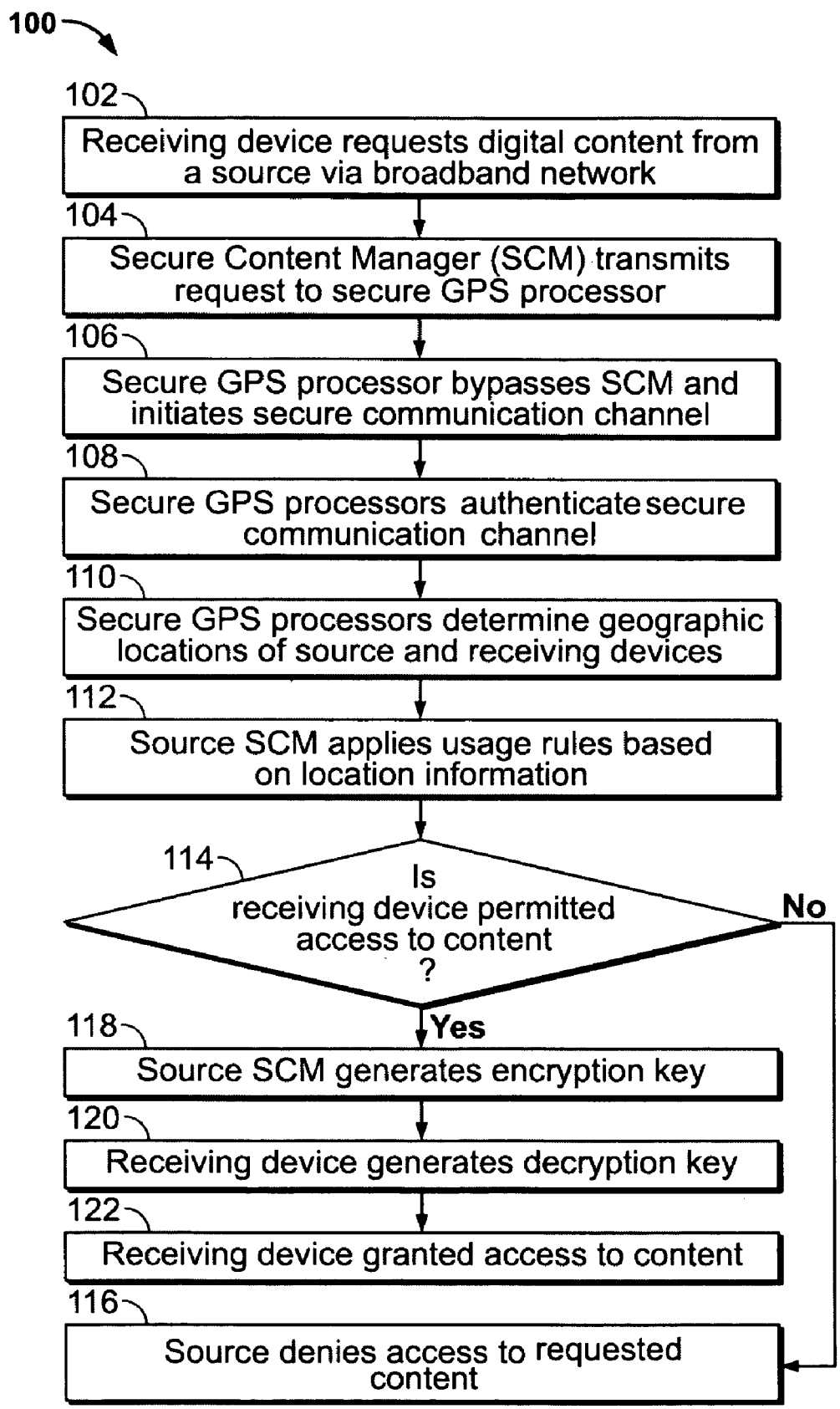
FIG. 1 is a flow chart illustrating exemplary steps for controlling distribution of digital content based on the geographic location or proximity of the receiving device.

FIG. 1 shows a method 100 for determining whether a receiving device is authorized access to the content, based on the geographic location of the receiving device. At step 102, the receiving device requests access to specific digital content from the source device. The request may be directed toward a secure content manager (SCM) within the source device via, for example, the Internet. At step 104, the SCM forwards the request to a triangulating geographic locating device operatively associated with the SCM. For example, the locating device may comprise a secure GPS processor (SGP), or a locating device based on triangulation of signals other than GPS, for example, GSM, CDMA or G3 mobile communication signals, or radio signals. Various triangulating devices are known in the art, and may be adapted for use with the invention by one of ordinary skill. Although the following description refers to use of an SGP as a locating device, it should be apparent that any other suitable triangulating device capable of determining a geographic location to within a desired degree of accuracy may be substituted for it. The locating device may be integrated in equipment with the SCM, or connected to it via a communication link.

Optionally, at step 106, a secure GPS processors (SGP) within the source and receiving devices bypass their host SCMs and establish a secure communication link with each other using their embedded secure, unique identifiers. Also optionally, at step 108, the SGPs may authenticate the secure communications link using one of several existing art methods. Use and authentication of communications directly between corresponding SGPs may add additional security and make it more difficult to circumvent a digital rights management method according to the invention. However, bypassing SCMs of the source and receiving devices is not required. In the alternative or in addition, the source and receiving devices may communicate directly with one another.

At step 110, the SGPs determine their own geographic location using input from an attached GPS antenna. In the alternative, a geographic location is determined for the receiving device only. Depending on the locating system used, a geographic location may be determined with coarse accuracy (e.g., in miles), within medium accuracy (e.g., 50-200 feet), or within fine accuracy (e.g., 1-10 meters). Coarse accuracy should be generally sufficient to determine the neighborhood, city, state, country or region of a device, while medium and fine accuracy may permit control of content to within a single family home, to an apartment home within a multiple dwelling unit, or even to a room within a home.

At steps 112 and 114, the SCM may use the geographic location information for the receiving device, or for both the receiving and source devices, to determine compliance with a content usage rule for the receiving device. For example, an SCM for the source device may determine whether the receiving device is local or remote, as defined by a content provider for that specific content. If the distance between source and receiver is less than a predetermined distance, the device may be characterized as local. Conversely, if the distance is greater than the pre-determined distance, the device may be deemed remote. In the alternative, or in addition, the SGP may test compliance with a usage rule based on a geographic location of the receiving device. In this case, it may not be necessary to determine a geographic location of the source device.

If application of the content usage rules results in a determination that the receiving device is not authorized to receive content, then access is denied at step 116. Optionally, a message may be sent to the receiving device indicating a status of the content request, and any other desired information. Access may be denied in various ways, for example, by preventing a decryption key from being supplied to the receiving device, or by preventing or disrupting transmission of the content to the receiving device.

If the receiving device is qualified for access to the content, at step 118 the source SCM may generate an encryption key for the content. Concurrently, at step 120, the receiving device may generate a decryption key. At step 122, the source and receiving devices may use existing cryptographic technology to establish a secure session and provide access to the requested content. It should be appreciated that other methods for providing access to controlled content may also be suitable.

Figure 2:
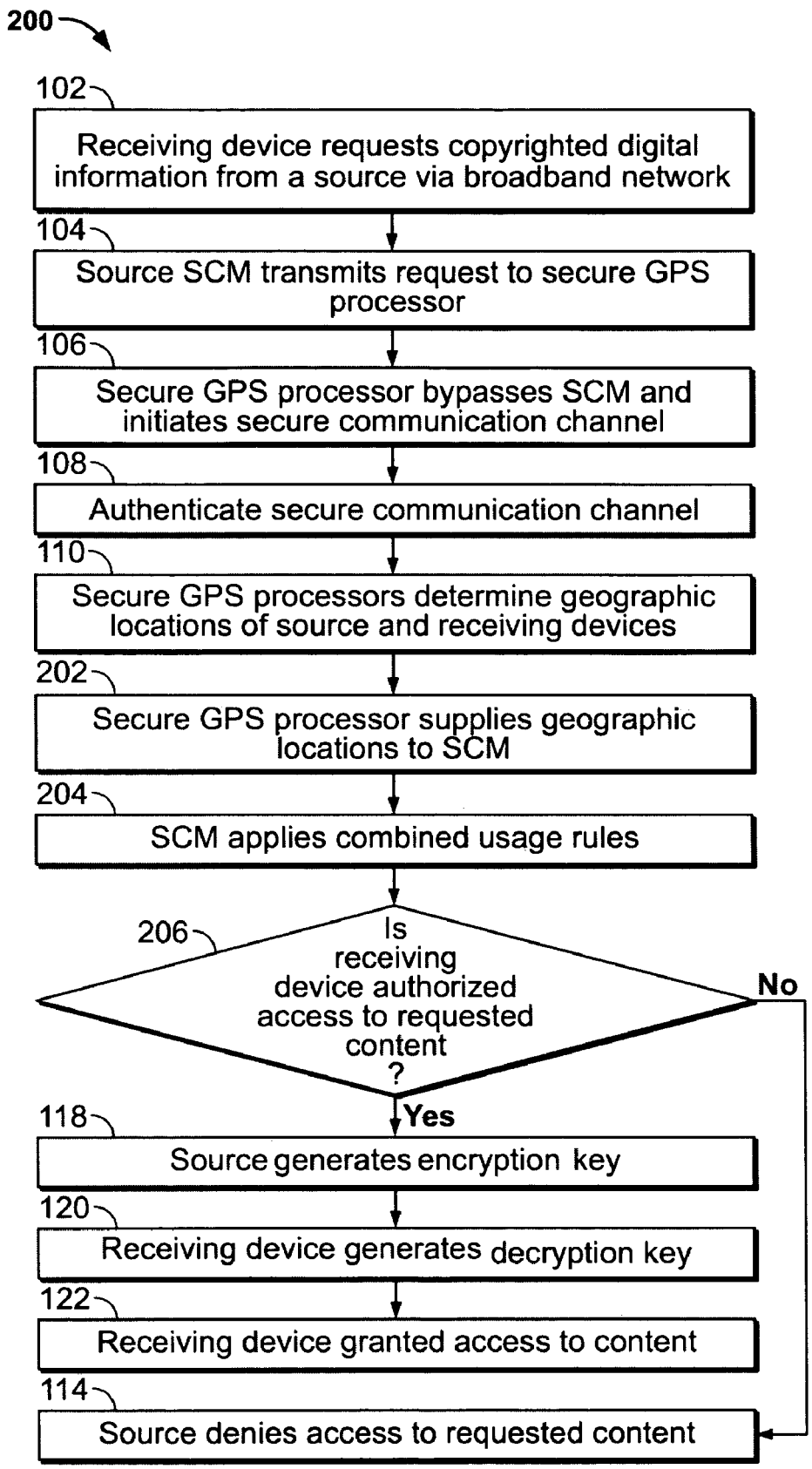
FIG. 2 is a flow chart illustrating exemplary steps for controlling distribution of digital content based on the combination of the geographic location or proximity of the receiving device and additional control parameter information.

FIG. 2 is a flow diagram illustrating an alternative method 200 for determining whether a receiving device is authorized access to the content, based on a combination of the geographic location of the receiving device and other available control parameters. Steps 102, 104, 106, 108 and 110 may be performed as described above for method 100. At step 202, the SGP may pass geographic or relative proximity information to the source SCM. The source SCM should be configured to have access to further parameters relevant to the receiving device. Such parameters may include, for example, an identity of a domain or user for the receiving device, a count of devices in the domain, a use history of the receiving device, a time-of-day, or any other information that is available and useful for determining whether a particular device should receive requested content. For example, an affinity parameter may describe a set of devices joined under a single domain belonging to a user, e.g., "all of John's devices." A device count parameter may describe a number of networked receiving devices in a domain.

At steps 204 and 206, the SCM may use the geographic location or proximity information from the SGP in combination with at least one additional parameter to test compliance of the receiving device with a usage rule. That is, based upon usage rules for the control of digital content as determined by a content provider, and on the combined control parameter information, the SCM may determine whether the receiving device is authorized access to the requested content. For example, a content usage rule may specify that a receiving device is authorized to receive content only if it is in a specific geographic location, belongs to an authorized user, and is not connected to more than three additional receiving devices. A great variety of other rules may also be suitable.

Depending on the result of the compliance testing in step 206—i.e., whether or not the receiving device is authorized to receive the particular content at issue—steps 114, 118, 120, and 122 may proceed as previously described in connection with method 100.

Figure 3:
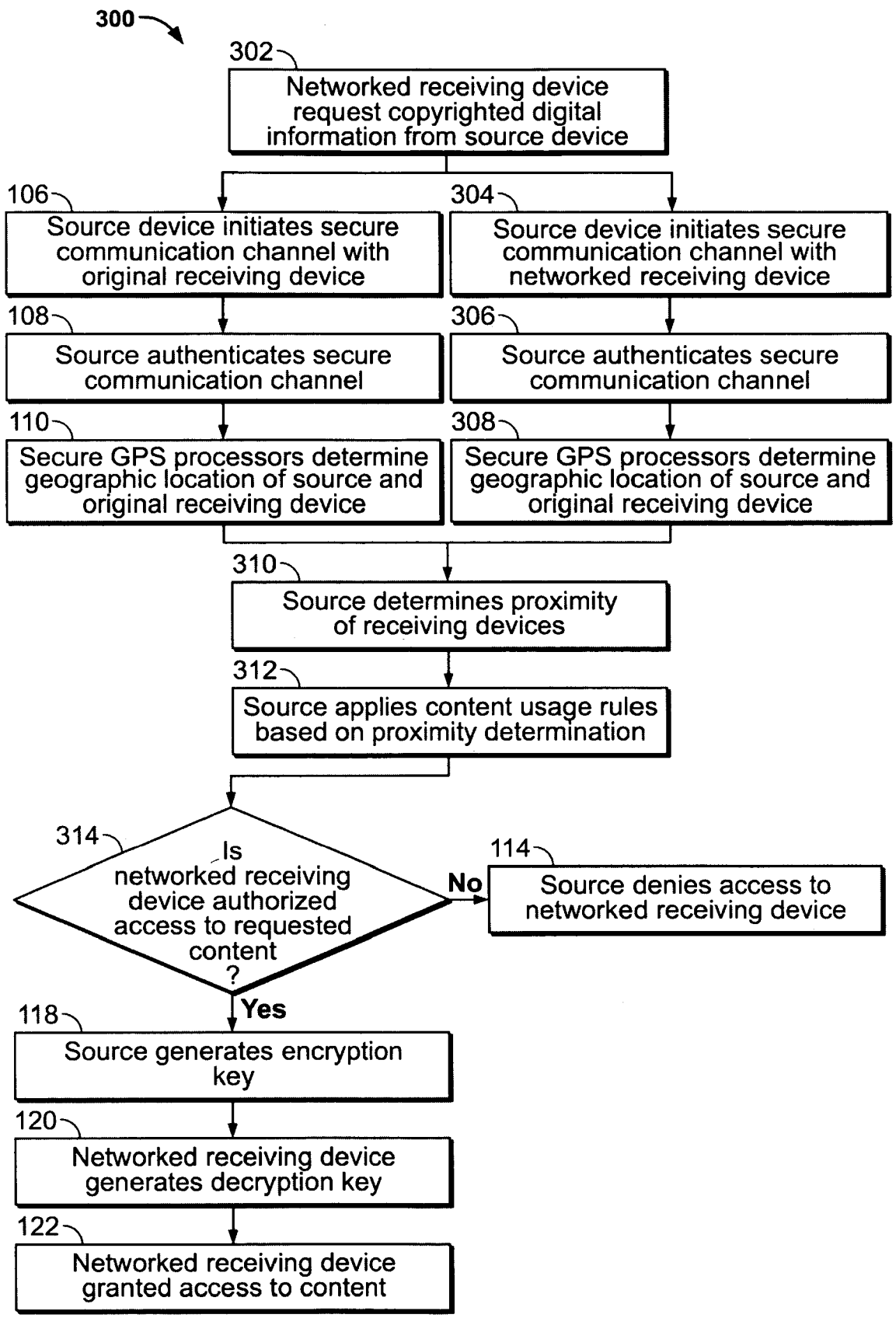
FIG. 3 is a flow chart illustrating exemplary steps of an alternative method for controlling re-distribution of digital content based on the geographic location or proximity of networked receiving devices downstream of the original receiving device.

FIG. 3 is a flow diagram showing a method 300 for determining whether a receiving device in a networked cluster of devices is authorized access to the content, based on a determination of the relative proximity of the networked receiving device to the original reception device. Method 300 may be useful, for example, when the content has already been requested and received by an original receiving device within the network, and a second receiving device within that network is requesting access to the same content. This may occur, for example, in a subscriber domain authorized for multiple devices and including compliant devices authorized to copy and store content, such as for time-shifting or retransmission purposes. That is, one or more receiving devices in the domain may also function as a source device for a downstream receiving device. When the downstream device requests access to content from another receiving device in the domain, it may be desirable to determine whether the downstream device is within the subscriber domain, based on its geographic location.

At step 302, the downstream device requests access to the content from a source device in the domain, which may have received the content from an original source located outside of the domain. At steps 106 and 304, the original source SGP may initiate communications with the original receiving device and the downstream receiving device. At steps 108 and 306, the source SGPs and both receiving device SGPs may authenticate these communication channels as previously described.

At steps 110 and 308, the source and both receiving devices may determine their geographic locations using input from their attached GPS antennas. At step 310, the source may gather the data on all three locations and determine the relative proximity of the receiving devices. For example, the source device may determine differences between the respective locations, and compare the differences to a pre-determined, maximum allowable separation distance. At steps 312 and 314, the source device may apply content usage rules for the second receiving device using the proximity determination. If the requesting device is not authorized, at step 114 the source SCM denies access. If the receiving device is authorized access, the source SCM generates an encryption key at step 118 and the receiving device SCM concurrently generates a decryption key at step 120. At step 122, the source and receiving devices use existing cryptographic technology to establish a secure session and provide access to the requested content.

In the alternative, if the downstream, networked device is requesting the content via the original receiving device, then the original source does not need to communicate with both devices. Instead, the first receiving device may perform either of methods 100 or 200 while functioning as a source device. Thus, for example, the first receiving device in the domain may determine whether or not the downstream receiving device is authorized for access, based at least in part on a predetermined maximum for the distance between multiple interconnected receiving devices, or on a geographic location of the downstream device.

Figure 4:
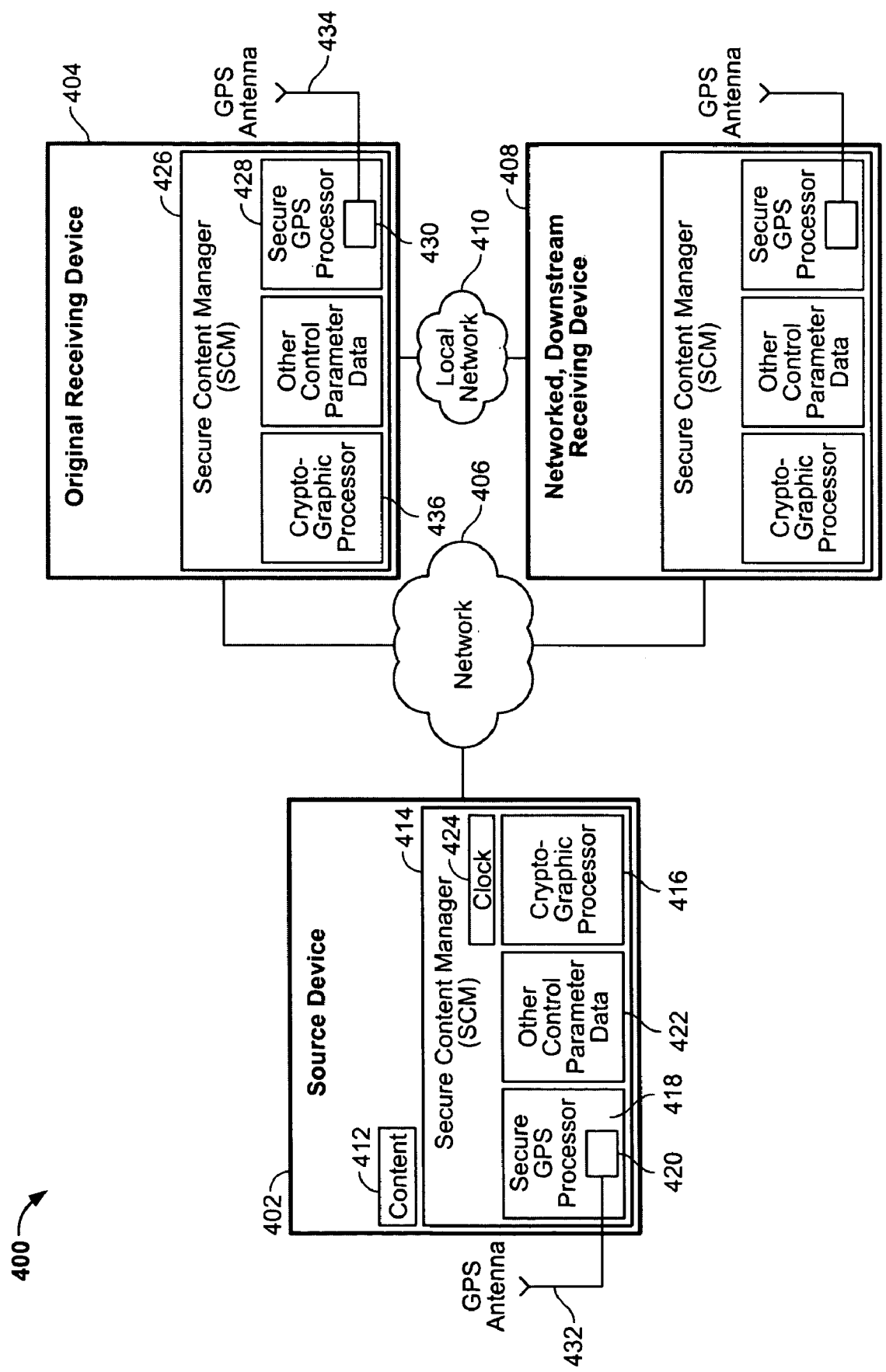
FIG. 4 is a block diagram showing an exemplary system according to the invention.

FIG. 4 is a block diagram showing an embodiment of a system 400 suitable for use with the invention. The system generally comprises a source device 402 having a communication link to a receiving device 404 via a network 406. The original receiving device 404 may comprise, for example, a set-top box, a DTV receiver, or a computer including a DRM player. The original receiving device 404 is further connected to additional receiving devices, e.g., receiving device 408, by a network 410. The additional receiving devices may include, but are not limited to additional set-top boxes, digital televisions and computer devices.

The original receiving device 404 requests specific digital content 412 from the secure content manager 414 of the source device. The secure content manager (SCM) may comprise a system that facilitates secure communication of content. The SCM should also be operative to apply content usage rules based on location or proximity parameters, optionally in combination with other parameters such as affinity to a certain user, identity of the user, device counting and time. An SCM or functionally equivalent device may be included within each compliant source and receiving device in system 400.

An SCM may comprise a cryptographic processor 416, a securely and robustly implemented secure GPS processor (SGP) 418, and a secure, unique identifier 420. Processors 416, 418 may be implemented in discrete, separate systems, or may be implemented as functional processes using a shared hardware or software system. The SCM may also include a database of other non-location/non-proximity parameters 422 for more sophisticated content management, and a secure clock or a secure cumulative timer 424 used to prevent spoofing of the GPS signal. In an alternative embodiment, the secure GPS processor may be replaced by another secure triangulation system based on cell phone, radio, or any other suitable signal.

The secure content manager 414 should be configured to communicate with the secure GPS processor 418. The secure GPS processor may be designed and manufactured to be robust and tamper-resistant. For example, all security-critical connections may be configured internal to a chip, or protected between chips on inaccessible buses. A bus may be rendered inaccessible, for example, by placing its signals on inner balls of Ball Grid Array packages, and interconnecting those packages with buried, via-less traces.

The secure GPS processor may be configured to bypass the SCM communication system and use the unique identifier 420 to establish a secure direct communication link with an SGP 428 in the original receiving device 404, using unique identifiers 420, 430. SGPs 418, 428 may be configured to authenticate one another as previously described. Once authenticated, both the source and the receiving device may use their tamper resistant GPS antennas 432 and 434 to determine their own locations. The GPS antennas may be designed in a tamper-resistant manner and also include tamper detection methods to prevent spoofing of an actual GPS satellite signal.

The SGPs 418 and 428 may be configured to operate in one of at least two different modes as previously described, to determine location or proximity for use with content usage rules for the requested content 412. For example, once the SGPs 418 and 428 have determined a geographic location for the receiving device 404, or its proximity to source device 402, one or both of the SGPs may transfer this information to the source device's SCM 414. The SCM 414 may be configured to use the location or proximity parameters with the additional non-location/non-proximity parameters located in a secure database 422 within the SCM 414 in the application of content usage rules.

The service provider's SCM 414 may also be configured to then use its embedded cryptographic processes 416 to generate an encryption key for the content, if use of the content is permitted by the receiving device. The receiving device's SCM 426 may be configured to concurrently use its embedded cryptographic processes 436 to generate a decryption key. The SCMs 414 and 426 may be configured to use any suitable method, for example, shared secrets or public/private key exchange, to establish a secure session and provide access to the requested content 412 by receiving device 404.

Generally, operative elements of the system may be implemented using suitable hardware and software as known in the art. For example, the hardware should comprise a suitable processor operatively associated with a memory. The memory is provided with software or firmware instructions, which when executed by the processor cause the source and receiving devices of the system to communicate and interact in the manner described.

In addition, system 400 may further comprise an additional receiving device 408 operative to request content 412 either from the source device 402, or as a downstream device from the original receiving device 404. The additional device 408 may communicate with source device 402 using public network 406, and with receiving/source device 404 via either network 406 or local area network 410. Receiving device 408 may be configured similarly to device 404, so as to interact with source device 402 in the same manner. In the alternative, or in addition, receiving device 404 may be configured to function similarly to source device 402, and to interact with receiving device 408 in a similar manner when providing content to downstream device 408.

As depicted in FIG. 4, SGPs may be functionally integrated into source or receiving devices. SGPs or similar locating devices may, in addition, be physically integrated into source or receiving devices, such as being placed on the same circuit board or inside of the same housing. Thus, the operation of these locating devices, and other elements of system 400, may be rendered convenient and virtually unnoticeable to compliant consumers of controlled content. In the alternative, SGPs or other elements of the system may be provided as stand-alone devices that are integrated into system 400 using a suitable communication link. It should also be noted that source devices or receiving devices lacking an SGP or any other geographic locating device may also be included in system 400, without departing from the scope of the invention.

Having thus described a preferred embodiment of a method and system for determining the geographic location or relative proximity of one or more networked devices, it should be apparent to those skilled in the art that certain advantages of the within system have been achieved. It should also be appreciated that various modifications, adaptations, and alternative embodiments thereof may be made within the scope and spirit of the present invention. For example, a system wherein the requesting device is requesting digital content has been described, but it should be apparent that the inventive concepts described above would be equally applicable to manage any location or proximity-dependent right for use of content of any type, whether or not in digital form. The invention is defined by the following claims.

What is claimed is:

1. A method for determining whether a second receiving device is authorized for access to copyright-protected digital content from a first receiving device to which the content has been distributed, the method comprising:

receiving electronic copyright protected content at a first receiving device authorized for electronically redistributing the protected content within a subscriber domain of receiving devices defined relative to the first receiving device, subject to content usage rules that specify a defined maximum separation distance relative to the first receiving device for additional devices in the subscriber domain;

receiving a request from a second receiving device, requesting that access to the protected content received by the first receiving device be provided to the second receiving device;

determining respective geographic locations of the first receiving device and of the second receiving device in response to the request, by communicating with a first GPS device proximal to the first receiving device and with a second GPS device proximal to the second receiving device;

computing a separation distance between the first receiving device and the second receiving device, using the geographic locations of the first receiving device and of the second receiving device determined by communicating with the first and second GPS devices;

providing the second receiving device with access to the protected content if the computed separation distance does not exceed the defined maximum separation distance specified by the content usage rules; and preventing the second receiving device from accessing the protected content, if the computed separation distance exceeds the defined maximum separation distance.

2. The method of claim 1, further comprising decrypting the geographic location of the second receiving device, using the first receiving device.

3. The method of claim 1, wherein computing the separation distance is performed by the second receiving device prior to accessing the protected content.

4. The method of claim 1, wherein computing the separation distance is performed by the first receiving device prior to authorizing the second receiving device for access to the protected content.

5. The method of claim 1, further comprising decrypting the content usage rules.

6. The method of claim 1, further comprising authenticating a location signal from the first GPS device to determine whether the location signal comprises falsified geographic information.

7. The method of claim 6, wherein the authenticating step further comprises comparing a time associated with the location signal with an independently-determined time.

8. The method of claim 1, wherein providing the second receiving device with access further comprises providing the second receiving device with a decryption key for the protected content.

9. The method of claim 1, further comprising authenticating a location signal from the second GPS device to determine whether the location signal comprises falsified geographic information.

10. The method of claim 1, further comprising receiving the protected content at the first receiving device selected from the group consisting of: a set-top box, a DTV receiver, or a computer including a DRM player.

11. The method of claim 1, further comprising providing the protected content from the first receiving device to the second receiving device via a broadband distribution network.

12. An apparatus for controlling access to copyright-protected digital content, comprising a first receiving device configured to receive copyright-protected digital content and content usage rules for the digital content from a remote source, the first receiving device further configured for:

receiving copyright protected content subject from the remote source;

electronically redistributing the protected content within a subscriber domain of receiving devices defined by proximity to the first receiving device, subject to content usage rules that specify a maximum separation distance relative to the first receiving device for authorized devices in the subscriber domain;

receiving a request from a second receiving device, requesting that access to the protected content received by the first receiving device be provided to the second receiving device;

determining respective geographic locations of the first receiving device and of the second receiving device in response to the request, by communicating with a first GPS device proximal to the first receiving device and with a second GPS device proximal to the second receiving device;

computing a separation distance between the first receiving device and the second receiving device, using the geographic locations of the first receiving device and of the second receiving device determined by communicating with the first and second GPS devices;

providing the second receiving device with access to the protected content if the computed separation distance does not exceed the defined maximum separation distance specified by the content usage rules; and preventing the second receiving device from accessing the protected content, if the computed separation distance exceeds the defined maximum separation distance.

13. The apparatus of claim 12, wherein the first receiving device is further configured for decrypting the content usage rules.

14. The apparatus of claim 12, wherein the first receiving device is further configured for authenticating a location signal from the first GPS device to determine whether the location signal comprises falsified geographic information.

15. The apparatus of claim 14, wherein the first receiving device is further configured for authenticating the location signal by comparing a time associated with the location signal with an independently-determined time.

16. The apparatus of claim 12, wherein the first receiving device is further configured for providing the second receiving device with a decryption key for the protected content, if the computed separation distance does not exceed the defined maximum separation distance.

17. The apparatus of claim 12, wherein the first receiving device is further configured for authenticating a location signal from the second GPS device to determine whether the location signal comprises falsified geographic information.

18. The apparatus of claim 12, wherein the first receiving device is selected from the group consisting of a set-top box, a DTV receiver, or a computer including a DRM player.

19. The apparatus of claim 12, wherein the first receiving device is configured for providing the protected content to the second receiving device via a broadband distribution network.

* * * * *